United States Patent [19]

Asmus

[11] Patent Number: 4,674,460
[45] Date of Patent: Jun. 23, 1987

[54] FUEL INJECTION SYSTEM

[75] Inventor: Thomas W. Asmus, Oak Park, Mich.

[73] Assignee: Chrysler Motors Corporation, Highland Park, Mich.

[21] Appl. No.: 781,559

[22] Filed: Sep. 30, 1985

[51] Int. Cl.⁴ .......................................... F02M 51/00
[52] U.S. Cl. ................................. 123/470; 123/445; 261/41.5
[58] Field of Search ............... 123/470, 472, 445, 585; 261/41.5

[56] References Cited

U.S. PATENT DOCUMENTS

| | | | |
|---|---|---|---|
| 2,635,862 | 4/1953 | Stoltman | 261/41.5 X |
| 2,674,443 | 4/1954 | Bracke | 261/41.5 |
| 2,694,560 | 11/1954 | Olson | 261/41.5 |
| 2,852,240 | 9/1958 | Goodyear | 261/41.5 |
| 4,216,753 | 8/1980 | Inove et al. | 123/472 X |
| 4,276,862 | 7/1981 | Matsumoto | 123/432 |
| 4,329,964 | 5/1982 | Morris | 123/557 |
| 4,387,063 | 6/1983 | Pontoppidan | 261/41.5 |
| 4,395,989 | 8/1983 | Eshelman et al. | 123/478 |
| 4,406,266 | 9/1983 | Kiesling | 123/438 |
| 4,442,818 | 4/1984 | Kashiwaya et al. | 123/494 |
| 4,458,650 | 7/1984 | Kessler et al. | 123/459 |
| 4,475,518 | 10/1984 | Kashiwaya et al. | 123/494 |
| 4,495,802 | 1/1985 | Kashiwaya et al. | 73/118 |
| 4,503,826 | 3/1985 | Kessler et al. | 123/470 |
| 4,508,091 | 4/1985 | Wakeman | 123/586 |
| 4,509,483 | 4/1985 | Johnson | 123/432 |
| 4,524,743 | 6/1985 | McAuliffe et al. | 123/438 |

FOREIGN PATENT DOCUMENTS 132018 10/1979 Japan ................................... 123/472

Primary Examiner—Tony M. Argenbright
Attorney, Agent, or Firm—Kenneth H. MacLean, Jr.

[57] ABSTRACT

An improved throttle body fuel injection system having a single electrically controlled type of fuel injector in combination with a throttle bypass air circuit to provide favorable fuel preparation at substantially closed-throttle positions such as idle and deceleration while providing good cylinder-to-cylinder air/fuel distributions at wide-open-throttle. Fuel is introduced downstream of the throttle at idle and upstream of the throttle at full load.

5 Claims, 5 Drawing Figures

FUEL INJECTION SYSTEM

BACKGROUND AND SUMMARY OF THE INVENTION

Until recently, carburetors have been utilized on automobile internal combustion engines to regulate the quantity of fuel and air delivered thereto to produce power over a wide speed range. Recently, electrically controlled fuel injection systems have been used in association with throttle body housings. The throttle body housing has an inlet passage therethrough with a pivoted throttle blade to control the volume of air delivered to the engine. The fuel injector is controlled by an electrical signal to produce an adjustably variable fuel spray into the inlet passage of the throttle body. This regulates the necessary quantity of fuel to mix with air flowing through the throttle body as regulated primarily by the throttle blade.

For many years, the carburetor has been satisfactory in providing a desired control of air and fuel for engine operation. The recent emphasis on stringent fuel economy, further decreased exhaust emissions and an upward trend in fuel volatility has focused attention on the weakness of carburetors.

The aforementioned electrically controlled fuel injector in a throttle body produces superior fuel economy by very accurately controlling air/fuel ratios. The subject fuel injection system is superior to over-throttle fuel injection systems currently used principally due to a higher degree of fuel atomization at idle.

It would be desirable to provide a fuel system combining the characteristics of the fuel injector and a carburetion system to thus produce a relatively low cost and efficient fuel system for internal combustion engines.

In a basic electrically controlled fuel injection system which is currently used, a fuel injector is mounted within a throttle body and produces a variable duration spray of fuel into the air passage which leads to the engine's combustion chambers. The fuel injector is typically located to spray fuel directly into the inlet passage upstream or above the throttle blade of the throttle body. Patents which illustrate this type of arrangement are U.S. Pat. No. 4,458,650 and U.S. Pat. No. 4,503,826. This basic arrangement is generally satisfactory, but is not particularly effective in producing good fuel atomization when the engine is idling.

A slight modification of the above described basic fuel injection system is found in U.S. Pat. No. 4,442,818 and U.S. Pat. No. 4,475,518. In this modification, a fuel injector is mounted in the throttle body for injection above the throttle blade for higher speed operation, but another electrically controlled fuel device controls a bypass circuit during idle operation of the engine.

Another modification of the basic fuel injection system is found in U.S. Pat. No. 4,276,862. It discloses a throttle body with a fuel injector mounted to spray fuel into the air passage upstream of the throttle blade and includes means to facilitate idle operation of the engine. The means includes a bypass of circuit of the throttle blade controlled by an adjustable needle valve for regulating the mexture of fuel with air. This type of idle control is like use in previous carburetion systems.

Lastly, a modification of the basic fuel injection system is found in U.S. Pat. No. 4,495,802, which discloses an electrically controlled injector to introduce fuel to the inlet passage downstream from a throttle blade. The patent does not disclose any alternate or separate means to introduce fuel and air during engine idle. Other arrangements of a fuel injector within a throttle body are shown in the following U.S. Pat. Nos. 4,395,989; 4,406,266; 4,508,091; 4,509,483; and 4,524,743. The aforementioned patents are similar in that the throttle body uses an electrically controlled injector to spray fuel into the passage at a location downstream from a throttle blade. The introduction of the fuel is through a spray bar means or the equivalent located downstream from the throttle blade. This would appear to be ineffective, particularly during idle and wide-open-throttle operation.

It is desirable to combine the superior fuel atomization characteristics of this fuel injection system, particularly at idle, with a means to control cylinder-to-cylinder distribution at wide-open-throttle. However, it has been found that the direct injection of fuel into the air passage against a substantially closed throttle blade produces undesirable fuel atomization. Therefore, the introduction of fuel and air downstream from the throttle blade is desirable during idle. On the other hand, it has been found that excellent fuel atomization and cylinder-to-cylinder distribution is achieved by directing fuel spray from the injector to a venturi means located upstream or before the throttle blade, particularly at higher engine speeds when the throttle blade is toward a wide-open position. Consequently, the subject system utilizes an electrically controlled fuel injector mounted to spray fuel into a cavity communicated by a first opening therefrom through a first passage into the air passage of the throttle body at a location below the throttle blade. The first passage means is utilized for idle and part-throttle during relatively low speed engine operation. A second opening and passage to the cavity is connected to a venturi means or device located in the throttle body at a location upstream or before the throttle blade. When the throttle blade is in a more nearly open position and, consequently, the air flow through the throttle body increases significantly, fuel passes from the cavity through the second passage to the venturi means where the fuel is effectively mixed with air flow passing therethrough. Thus, fuel is thoroughly atomized and mixed with air during the mid and higher speed operation of the engine.

From the above discussion, it is clear that the subject fuel injection system utilizes a dual fuel passage system extending from the electrically controlled fuel injector. The dual passage system automatically changes from the introduction of fuel below the throttle blade during idle or low speed engine operation to the introduction of fuel through a venturi means located upstream of a throttle blade during higher speed engine operation.

Further advantages and features of the subject invention will be more readily apparent from a detailed description of the subject fuel injection system as described hereafter, reference being had to the accompanying drawings in which preferred embodiments are illustrated.

IN THE DRAWINGS

DETAILED DESCRIPTION OF THE EMBODIMENTS

Figure 1:
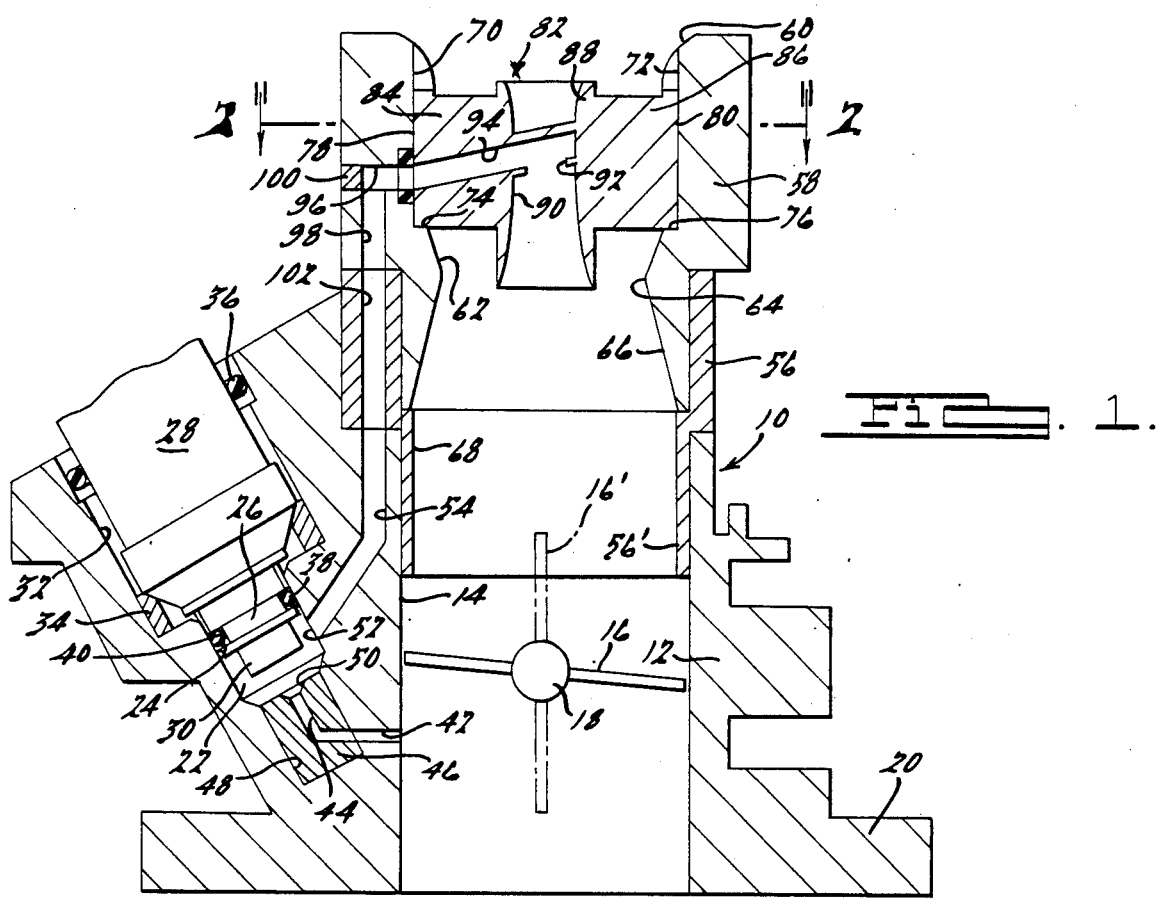
FIG. 1 is an elevational sectioned view of a throttle body and fuel injection device.

In FIG. 1, an embodiment of the subject fuel injection assembly 10 is illustrated. The assembly 10 includes a throttle body including a housing or base portion 12 defining an air passage 14 therethrough for supplying the engine with air and fuel. A throttle blade 16 is mounted in passage 14 about a shaft 18 for controlling the flow of fluid to the engine through the passage 14. The housing 12 of the throttle valve includes an outwardly extending portion 20 which generally encircles passage 14 for mounting the throttle valve housing on the intake manifold of an internal combustion engine in a conventional manner such as by bolt and nut fasteners.

A cavity 22 is formed adjacent passage 14 in the housing 12. A recess with a cylindrical wall 24 thereof receives a cylindrical end portion 26 of an electrically controlled fuel injector assembly 28. The fuel injector assembly 28 is now a fairly conventional device to spray fuel into an engine. The internal parts of the injector are known, and it is unnecessary to illustrate and describe them for the purposes of this application. The internal construction of various electrically controlled fuel injectors is found in several of the aforementioned patents. Basically, the fuel injector 28 receives an electrical signal at a certain selected frequency supplied by an electronic control unit. The selected frequency supplied to the fuel injector 28 is varied according to various engine parameters as is known in the art. This frequency signal to the fuel injector 28 produces a variable duration spray of fuel exiting the lower end 30 of the fuel injector. Typically, the duration of spray is quite short and the frequency lower during idle conditions of the engine than during higher speed engine operation.

The fuel injector 28 is supported within a larger cylindrical cavity 32 of the housing 12 by a mounting ring 34. Dirt induction and fuel leakage from the space defined by cavity 32 is prevented by an O-ring type seal 36 between the outer body of the fuel injector 28 and the body 12 of the throttle body. Likewise, a second O-ring 38 within a channel 40 formed in the end 26 of the fuel injector 28 prevents leakage from cavity 22.

In response to a frequency signal from the associated electronic control unit, the injector 28 sprays fuel at an appropriately selected rate into cavity 22. When the throttle blade 16 is in or near the closed position shown in FIG. 1, the air flow through the passage 14 is substantially blocked. Therefore, the flow velocity is relatively low except, perhaps, in the vicinity of the blade's peripheral edge. This produces a substantial low pressure condition downstream or below the throttle blade 16 compared to atmosphere or above the blade 16. Resultantly, the spray from the injector 28 is drawn into the housing passage 14 at a location downstream from throttle blade 16 through a passage means 42 in the housing 12. Specifically, the passage means 42 includes an angled portion 44 which is formed in a cavity insert member 46. The cavity insert member 46 is supported within a lower extension 48 of the cavity 22. A slight beveled opening 50 at the upper end of the passage 44 helps smoothly funnel fuel into the passage 42.

The aforedescribed flow of fuel occurs whenever the associated internal combustion engine is operating at idle or part-throttle operating conditions. When the throttle blade 16 pivots clockwise toward an open position 16, a higher pressure downstream of blade 16 causes flow to the left in passage 42 into the cavity 22. Fuel from the injector 28 then flows into a second opening 52 in the cavity 22. The second opening 52 communicates with a passage 54 in the body 12 and eventually to passage 14 at a location upstream of throttle blade 16 in the manner to be described in the next paragraph.

The upper air inlet end of housing 12 supports a generally cylindrical member 56 having end portion 56' telescopically extending into the upper end portion of the housing 12. Likewise, a second member 58 is supported by member 56. Member 58 includes an open inlet end 60 communicated with an internal passage defined by inner wall means 62 which projects radially inward from end 60 to a lesser diameter mid-wall means 64. Thereafter, wall means 66 projects radially outward to merge with an inner cylindrical wall 68 of member 56.

Figure 2:
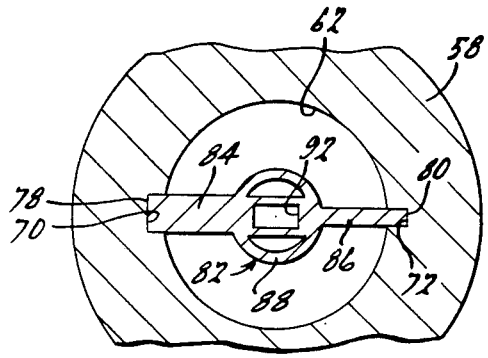
FIG. 2 is a sectional view taken along section lines 2—2 in FIG. 1 and looking in the direction of the arrows.

Member 58 defines two axially extending channels 70 and 72 as shown in FIGS. 1 and 2. The channels 70 and 72 terminate in axial facing shoulder portions 74 and 76, respectively. The channels receive edge portions 78 and 80 of a venturi assembly 82. Specifically, the edge portions 78 and 80 are formed on the outer ends of radially directed struts 84 and 86 from a cylindrical mid-portion 88 of the venturi assembly 82. The struts 84 and 86 are relatively thin to permit the flow of air thereby (on either side of the struts in FIG. 1). The struts 84 and 86 support midportion 88 in the form of a venturi configured passage means. The venturi passage has a variable diameter wall means 90 which is relatively larger at the upper inlet end, becomes smaller toward its mid-portion and then becomes larger at the lower outlet end. Resultantly, air passing therethrough increases in velocity and decreases in pressure around the mid-portion of passage 90. As is conventional in carburetors, this pressure decrease is conductive to drawing fuel from an opening 92 which communicates with a passage 94 in the venturi assembly 82. Passage 94 connects with a radially extending passage 96 in member 58 and then with an axial extending passage 98 in member 58. A plug 100 in the radially outer end of passage 96 allows for convenience in drilling the passage 96 through member 58 and serves to prevent fluid leakage therefrom.

The axial passage 98 in member 58 is aligned with axial passage 102 in member 56. In turn, the passage 102 fluidly communicates with the passage means 54 in the body 12. Consequently, fuel may flow from opening 52 in cavity 22 upward through passage 54 and then through passages 102, 98, 96 and 94 to the downwardly directed opening 92 located in the central portion of the venturi passage 90. This upward flow occurs only when the air pressure adjacent opening 92 is depressed relative to the air pressure downstream from the throttle blade 16.

During part or wide-open-throttle, when the throttle blade 16 is somewhat near the position 16' in FIG. 1, a higher pressure downstream from the throttle blade 16, relative the pressure at opening 92 causes air to flow into the passage 42 and to cavity 22. Resultantly, the fuel from the injector 28 is passed through the opening 52 and through passages 54, 102, 98, 96 and 94 to opening 92. With the throttle blade in the position 16', the flow of air through the venturi 82 and the passage 14 of the housing is rapid. The venturi 82, in combination with the effect caused by wall surfaces 62, 64 and 66 effectively and desirably atomizes the fuel and produces thorough mixing with air prior to passing into an intake manifold of the internal combustion engine located downstream from the throttle blade 16 (not shown).

Thus, it can be readily understood that during lower speed engine operations, such as at idle or part-throttle, a flow of air and fuel from the injector is rapidly drawn from the cavity 22 through the passage 42 to a location in the throttle body passage below the throttle blade 16. In an alternative phase of higher speed operation of the engine, including wide-open-throttle operation, air and fuel flow from the cavity 22 to the venturi assembly 82 located upstream of the throttle blade 16. Thus, the cavity 22 forms a reversible flow passage means for the fuel supply. The fuel flows in alternate opposite paths and the direction automatically reverses according to the engine operational mode which is most appropriate.

Figure 3:
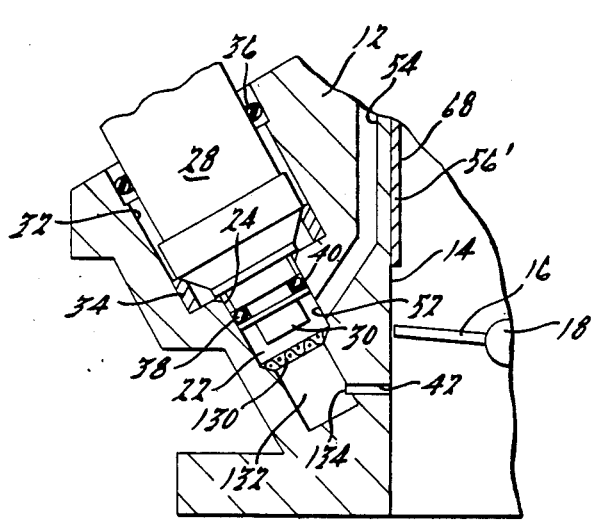
FIG. 3 is an elevational sectioned view of a first modification of the invention.

In FIG. 3 of the drawings, a modification of the device shown in FIGS. 1 and 2 is illustrated. Because many components and parts are identical with the device of FIG. 1, the same numerals are utilized to indicate identical components and parts. The primarily difference of the embodiment shown in FIG. 3 is the use of a screen member 130 placed directly across from the end 30 of the fuel injector 28. This screen 130 separates the cavity 22 into an upper portion or chamber enclosing the end 30 of injector 28 and a lower portion or chamber 132. Passage 42 opens at 134 to the lower chamber 132 and communicates with passage 14. The screen 130 tends to intercept the spray of fuel into the cavity while not substantially inhibiting the flow of fuel from injector 28 to opening 134. However, the screen does facilitate effective picking up and distribution of fuel as air flows in a reverse direction from passage 42 into the cavity 134 and thereafter through the screen 130 and into the opening 52.

Figure 4:
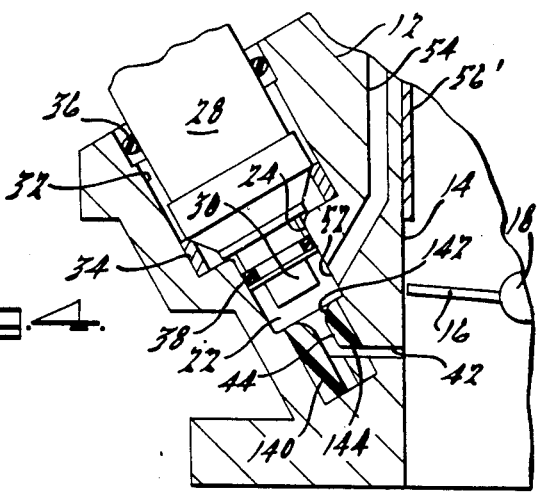
FIG. 4 is a view similar to FIG. 1 showing a second modification of the invention.

In FIG. 4, another modification is illustrated and includes many components identical to that shown in FIG. 1 and, therefore, those parts are labeled the same. In FIG. 4, the primary difference is found in the passage forming insert member 140. The insert member 140 includes passage means 44 with a gradually curved inlet portion 142 at the mouth to smoothly receive the fuel from the injector 28. Axial passage 44 extends completely through the insert 140 for convenience of forming the passage and is intercepted by a substantially radially directed passage 144 for communication with the main air passage 42 in the housing 12.

Figure 5:
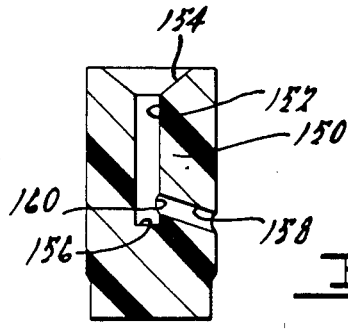
FIG. 5 is an enlarged partial sectioned view of a modification in one component of the system shown in FIG. 1.

In FIG. 5, a slightly modified insert member 150 is illustrated which is similar to the insert 46 shown in FIG. 1, but differs as follows. An axially extending passage 152 thereof has a wide inclined mouth or opening 154 for receiving fuel from injector 28. The axial passage 152 terminates at bottom wall portion 156. An inclined radial passage 158 which is adapted to communicate with passage 42 in the housing 12 opens into the axial passage 152 at 160 which is spaced slightly upward from the bottom wall 156 of the passage 152. This slight spacing permits a pool of fuel to develop therein which provides a small fuel reservoir desirable under certain transient conditions.

Althouth several embodiments of the invention have been illustrated and discussed in detail, other embodiments are contemplated which still would fall within the scope of the following claims which define the invention.

I claim:

1. Fuel metering apparatus for supplying the air and metered rates of fuel flow to an internal combustion engine comprising:

a throttle body means having a main fluid induction passage means for supplying the engine with fuel and air;

throttle valve means including a pivotal throttle blade movable between a substantially closed position for idle and a wide open position for high speed engine operation for controlling the flow rate of air and fuel into the engine;

the throttle body means forming an interior cavity near the fluid induction passage means;

a fuel injection device having an outlet end to the cavity of the throttle body for introducing fuel spray thereto;

a first passage means connecting the cavity and the main fluid induction passage means of the housing at a location thereto downstream of the throttle valve means;

second passage means connecting the cavity and the main fluid induction passage means of the housing at a location thereto upstream of the throttle valve means;

means at the upstream location for producing a lower fluid pressure upstream of throttle valve when moved from its closed position whereby fuel from the cavity is drawn through the second passage means and into the main fluid induction passage means when the throttle valve is moved from a closed operative position.

2. Fuel metering apparatus for supplying the air and metered rates of fuel flow to an internal combustion engine, comprising:

a throttle body housing means defining a main fluid induction passage means for supplying the engine with fuel and air;

throttle valve means including a pivotal throttle blade movable between a substantially closed position for idle and a wide open position for high speed engine operation for controlling the flow rate of air and fuel into the engine;

interior cavity means formed in the throttle body housing adjacent the main fluid induction passage means;

a fuel injection device with an outlet end communicating with the cavity means of the housing for introducing a fuel spray therein;

first and second openings to the cavity;

a first fluid passage means connecting the first cavity opening with the main fluid induction passage means at a location downstream from the throttle valve means;

means forming a venturi assembly with a fluid passage therethrough located across the main fluid induction passage means at an upstream location with respect to the throttle valve means and defining a throat portion producing lower fluid pressure thereby than elsewhere.

a second fluid passage means connecting the second cavity opening with the main fluid induction passage means at a location adjacent to the throat portion of the venturi assembly, whereby during idle and lower speed engine operation, fluid pressure downstream of the throttle valve means is sufficiently lower than at the venturi throat portion so that air therefrom and fuel from the fuel injector device flows from the cavity into the first opening and then through the first passage means to the main fluid induction passage means and, whereby during higher speed engine operation, fluid pressure at the venturi throat portion is sufficiently lower than downstream from the throttle valve means to that air therefrom and fuel from the fuel injector device flows from the cavity into the second opening and then through the second passage means to the main fluid induction passage means.

3. A fuel metering apparatus as set forth in claim 2 in which the first opening and connected passage means is formed in a discrete insert member supported in an extended portion of the cavity and with the passage means therein aligned to connect with to the main induction passage means.

4. The fuel metering apparatus set forth in claim 2 in which the cavity is separated into first and second chambers by a transversely extending screen means located to intercept the spray of fuel from the outlet end of the fuel injection means;

the first opening being located in the chamber on an opposite side of the screen means than the fuel injection device;

and the second opening being located in the chamber on the same side of the screen means as the fuel injection device.

5. A fuel metering apparatus as set forth in claim 3 in which the insert device includes an axially directed passage extending to a prdetermined depth in the insert and including a bottom end wall means;

the insert device including a second passage extending in a generally radially direction and intercepting the first passage upward from the bottom end wall means thereof to form a small reservoir space thereabove.

* * * * *